Patented Oct. 14, 1941

2,259,248

UNITED STATES PATENT OFFICE 2,259,248

PROCESS FOR THE PRODUCTION OF SULPHURYL CHLORIDE

Ralph K. Iler, Cleveland Heights, Ohio, assignor to E. I. du Pont de Nemours & Company, Wilmington, Del., a corporation of Delaware No Drawing. Application November 29, 1938, Serial No. 242,897

3 Claims. (Cl. 23—203)

This invention relates to processes for producing sulphuryl chloride from salt and sulphur trioxide, and is particularly directed to the manufacture of sulphuryl chloride with processes wherein a mixture of sodium chloride and sulphur trioxide is heated to a temperature between about 30 and about 250° C. for an initial reaction period, is then heated above about 250° C. to effect formation of gaseous products by thermal decomposition, and then the gaseous decomposition products are conducted through a suitable catalyst and combined to form sulphuryl chloride.

The separate preparation of chlorine is a necessary step in the preparation of sulphuryl chloride by processes heretofore commonly employed in the art. This preparation of chlorine has, for example, been accomplished by the electrolysis of sodium chloride solution with the simultaneous formation of sodium hydroxide. The production cost of chlorine, and consequently of sulphuryl chloride, by such a process is therefore dependent to a considerable degree on what value may be recovered from the sodium hydroxide formed as a by-product. The application of such a process also is limited to those localities where a ready market for sodium hydroxide exists.

Considered without relation to by-product recovery, chlorine is a relatively expensive material from which to prepare sulphuryl chloride. Since more than half of the weight of sulphuryl chloride is combined chlorine, it is imperative that the cost of the chlorine used be as low as possible.

Processes for making sulphuryl chloride have also been proposed in which sulphur dioxide is used as a raw material. Sulphur dioxide may readily be made by the oxidation of sulphur in air, but the sulphur dioxide so produced is diluted with considerable volumes of inert gas. Accordingly, any process employing such a gas mixture in the production of sulphuryl chloride must have sufficient excess capacity to handle this inert gas. The additional plant investment required to provide this excess capacity of course adds to the cost of the process.

Now I have found that sulphuryl chloride may be produced without separately preparing either chlorine or sulphur dioxide by heating a mixture of salt and sulphur trioxide at a temperature between about 30 and about 250° C. for an initial reaction period, then heating the mixture above about 250° C. to form gaseous products by thermal decomposition, and then conducting the gaseous decomposition products through a suitable catalyst where they combine to form sulphuryl chloride.

Sulphuryl chloride may be produced to particular advantage by a process of my invention in situations where a source of chlorine at low cost is not available. Since chlorine is not used in a process of my invention, fluctuations in the price of sodium hydroxide, the usual by-product from chlorine manufacture, are of no concern.

It is not necessary in a process of my invention that the sulphur-containing raw material be previously purified from inert gases because the initial stage of the reaction proceeds satisfactorily even with the gas of low sulphur trioxide content. This ability of my novel processes to employ a sulphur-containing gas which also contains inert gases provides a further advantage over the methods heretofore available.

In the practical application of a process of my invention to the production of sulphuryl chloride I prefer to use salt in a finely divided state. In general, it may be said that the finer the salt, the more rapidly will the initial stage of the reaction proceed.

The sulphur trioxide which is mixed with the salt in a process of my invention may be of relatively high $SO_3$ content, or it may be a gas which contains substantial amounts of inert gases. The converter gas from a catalytic contact converter of the type commonly used in sulphuric acid manufacture, which contains approximately 10% by volume of $SO_3$ may for instance be employed to advantage because of its availability. Gases of even lower $SO_3$ content may be used if desired, a gas containing as little as .01% by volume of $SO_3$ being suitable.

In the first stage of my novel processes the salt and sulphur trioxide-containing gases are brought together under conditions adapted to effect intimate contact. A coating over of the salt particles with the products of the reaction should be avoided. The reaction may for instance be effected by passing sulphur trioxide in contact with salt while subjecting the salt to attrition as, for instance, by tumbling it in a ball mill.

The temperatures employed in the separate stages of a process of my invention may be considerably varied. In the initial stage of the reaction the temperature is maintained below about 250° C. and preferably between about 30 and 100° C. When the reaction between the salt and sulphur trioxide has been effected, the temperature is raised above about 250° C. to form gaseous products by thermal decomposition. Preferably the temperature is maintained in the range from about 500 to 600° C. during this period. The recombination of the gaseous decomposition products to form sulphur chloride is effected at a temperature in the range from about 0 to 50° C. and preferably at a temperature of about 30° C.

To form sulphuryl chloride from the gaseous thermal decomposition products of the second stage of a process of my invention, the gases are brought into contact with a suitable catalyst. I have found that catalysts heretofore employed in the art for combining sulphur dioxide and chlorine are suitable. Such catalysts as hydrocarbons, ethers, ketones, terpenes, glycerol esters, camphor, or eucalyptol may be used or the gases may be passed through an ozonizer. I prefer to pass the gases over activated carbon or charcoal at a temperature of about 30° C. I then condense the sulphuryl chloride by suitable cooling.

While I have described my novel processes for producing sulphuryl chloride with particular reference to optimum conditions, it will be understood that without departing from the scope of my invention those skilled in the art may readily produce sulphuryl chloride in numerous ways and under various conditions.

I claim:

1. In a process for producing sulphuryl chloride, the steps comprising heating a mixture of sodium chloride and sulphur trioxide to a temperature between 30 and 250° C. for a period of time sufficient to effect reaction between the sodium chloride and sulphur trioxide, heating the reacted mixture at a temperature above 250° C. for a further period to effect thermal decomposition with the formation of gaseous decomposition products including chlorine and sulphur dioxide, and producing sulphuryl chloride by effecting catalytic combination of the gaseous decomposition products at a temperature between about 0 and 50° C.

2. In a process for producing sulphuryl chloride, the steps comprising heating a mixture of sodium chloride and sulphur trioxide to a temperature from 30 to 100° C. for a period of time sufficient to effect reaction between the sodium chloride and sulphur trioxide, heating the reacted mixture at a temperature from 500 to 600° C. to produce gaseous decomposition products including chlorine and sulphur dioxide and producing sulphuryl chloride by the catalytic combination of the gaseous decomposition products.

3. In a process for producing sulphuryl chloride, the steps comprising heating a mixture of sodium chloride and sulphur trioxide to a temperature from about 30 to 100° C. for a period of time sufficient to effect reaction between the sodium chloride and sulphur trioxide, heating the reacted mixture at a temperature from about 500 to 600° C. for a further period to produce gaseous decomposition products including chlorine and sulphur dioxide, and conducting the gaseous decomposition products through activated carbon as a catalyst.

RALPH K. ILER.